United States Patent [19]

Takahashi

[11] Patent Number: 4,555,203
[45] Date of Patent: Nov. 26, 1985

[54] DRILLING MACHINE
[75] Inventor: Shiro Takahashi, Tokyo, Japan
[73] Assignee: Nitto Kohki Co., Ltd., Tokyo, Japan
[21] Appl. No.: 442,714
[22] Filed: Nov. 18, 1982
[30] Foreign Application Priority Data
Nov. 20, 1981 [JP] Japan .............. 56-172011[U]
[51] Int. Cl.[4] ................................. B23B 51/04
[52] U.S. Cl. ...................... 408/119; 408/68; 408/204; 408/209
[58] Field of Search ............ 408/73, 74, 85, 86, 408/110, 111, 112, 117, 118, 119, 139, 142, 204, 206, 209, 703, 67, 68, 713

[56] References Cited

U.S. PATENT DOCUMENTS

| 2,025,536 | 12/1935 | Statz | 408/14 |
|---|---|---|---|
| 2,754,864 | 7/1956 | Elsy | 408/119 |
| 2,926,555 | 3/1960 | Joy | 408/119 |
| 3,825,362 | 7/1974 | Hougen | 408/204 |
| 4,090,804 | 5/1978 | Haley | 408/119 |
| 4,193,721 | 3/1980 | Hougen | 408/204 |
| 4,204,783 | 5/1980 | Hougen | 408/204 |
| 4,288,183 | 9/1981 | Kato | 408/142 |
| 4,385,853 | 5/1983 | Strange et al. | 408/204 |
| 4,408,935 | 10/1983 | Miyanaga | 408/206 |

FOREIGN PATENT DOCUMENTS

| 201114 | 12/1982 | Japan | 408/119 |
|---|---|---|---|
| 1291146 | 9/1972 | United Kingdom | 408/139 |

*Primary Examiner*—Gil Weidenfeld
*Assistant Examiner*—Daniel W. Howell
*Attorney, Agent, or Firm*—Birch, Stewart, Kolasch & Birch

[57] ABSTRACT

A drilling machine including a spindle and an elevating hollow shaft rotatable in unison with the spindle. An annular cutter is mounted in axial alignment with the hollow shaft and an elevating center drill is mounted in axial alignment with the annular cutter. The drill is movable to descend relative to the annular cutter to initiate the formation of a center hole in a workpiece prior to drilling. The drilling machine further includes a cylindrical member vertically movable and rotatably supported within a holder with the elevating hollow shaft being vertically movable and rotatably supported within the cylindrical member.

5 Claims, 4 Drawing Figures

DRILLING MACHINE

BACKGROUND OF THE INVENTION

The present invention relates to an improved drilling machine including an annular cutter, which permits a more rapid conversion of centering to drilling.

With an annular cutter of the type designed and intended to form a bore of a diameter appreciably larger than that of a bore obtained by drilling, it is difficult, or even impossible, to precisely provide such a bore in a given position, since the center of the cutter is so unstable that it is not in axial alignment with the drilling machine. It has been found that this problem is solved by using an annular cutter of the type including a center drill. However, there is still left much to be desired as far as a rapid centering-to-drilling conversion is concerned.

SUMMARY OF THE INVENTION

It is therefore a main object of the present invention to provide an improved drilling machine which assures a more rapid centering-to-drilling conversion and, at the same time, can adjust the depth of a center hole.

According to the present invention, this object is achieved by the provision of a drilling machine including an elevating hollow shaft which is rotatable in unison with a spindle, an annular cutter mounted in axial alignment with said hollow shaft, and an elevating center drill mounted in axial alignment with said annular cutter, said drill designed to descend following said annular cutter and begin to form a center hole in a workpiece prior to drilling.

BRIEF DESCRIPTION OF THE DRAWINGS

The above-mentioned and other objects and features of the present invention will become apparent from a reading of the following detailed description of one preferred embodiment illustrated in the drawings, wherein.

DETAILED DESCRIPTION OF THE INVENTION

A stand 1 includes a lower base 2 with a built-in electromagnet for fixing the stand onto a workpiece. As is the case with the conventional drilling machine, the stand 1 has a machine body 3 which is vertically movable by turning a handle 4 mounted on one side of the stand 1.

Figures 1, 2:
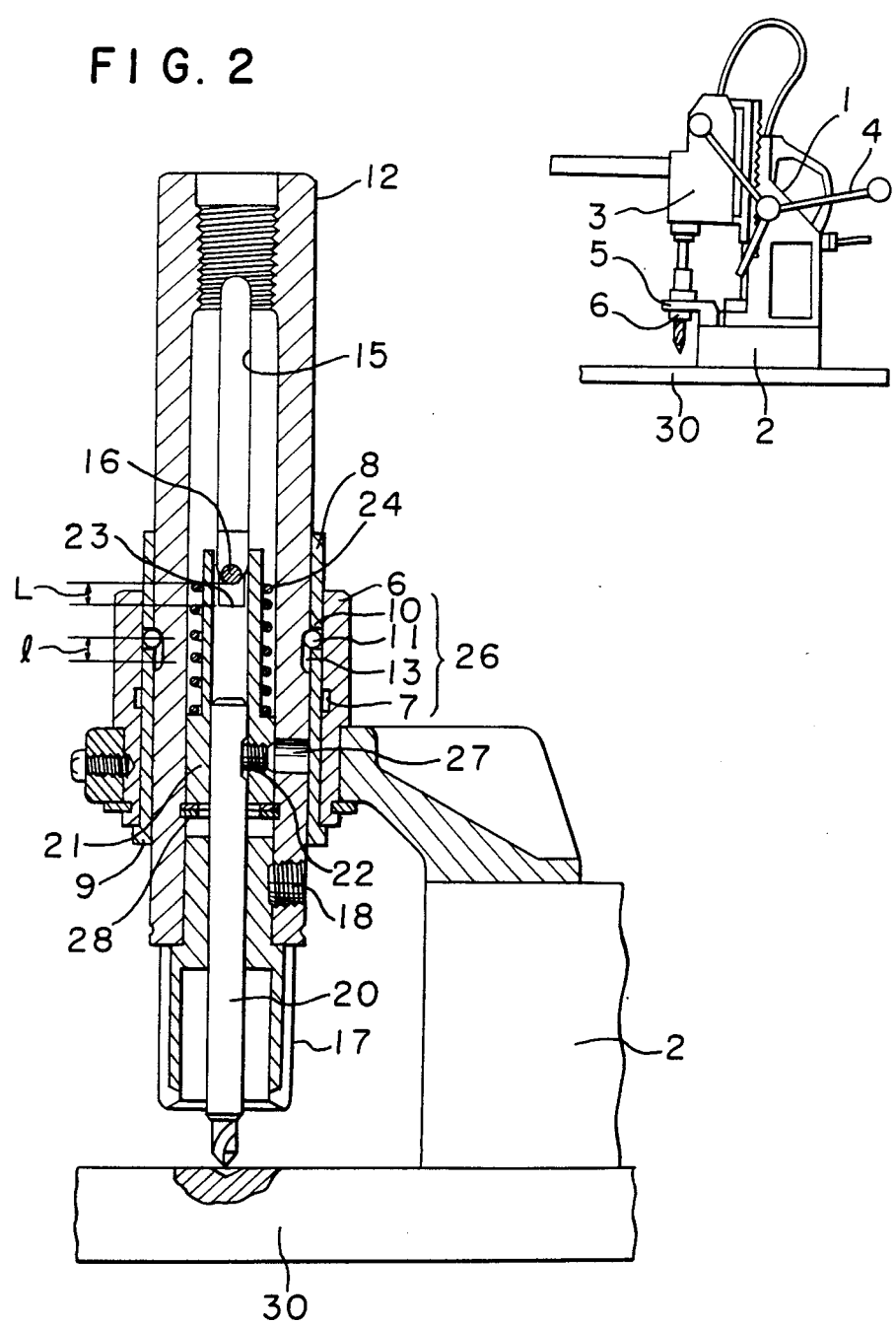
FIG. 1 is a schematical view showing one embodiment of the present invention.
FIG. 2 is a sectional view showing part of that embodiment.
Figure 3:
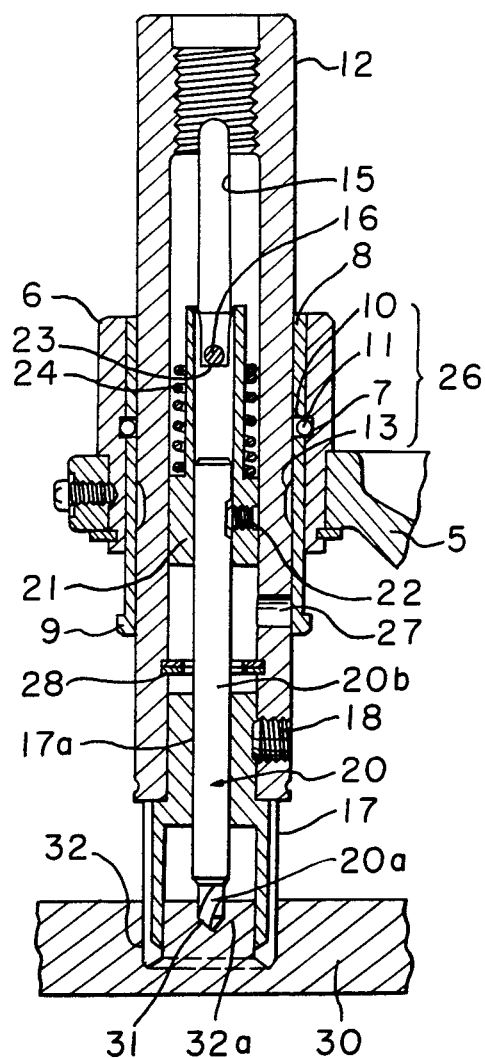
FIG. 3 is a sectional view showing part of that embodiment which is in operation.
Figure 4:
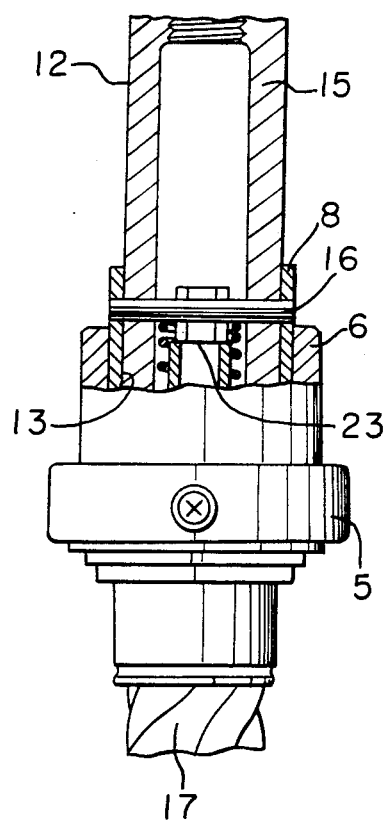
FIG. 4 is a sectional view showing part of that embodiment to illustrate the relationship between the elongated holes and the pin.

A bracket 5 is fixedly provided on the front end of the base 2, and has a holder 6 vertically inserted through its free end. An annular groove 7 is formed in the intermediate inner wall of the holder 6. A cylindrical member 8 is supported within the holder 6 in a vertically movable and rotatable manner, and provided at its lower peripheral end with an engaging portion 9. A plurality of holes 10 are provided through the intermediate outer periphery of the cylindrical member 8 at equal intervals, said holes being adapted to receive a plurality of balls 11 each having a diameter larger than the thickness of the cylindrical member 8. A cylindrical shaft 12 having its upper end joined to the shaft of a motor (not shown) for the machine body 3 is supported within the cylindrical member 8 in a vertically movable and rotatable manner, and includes in its outer periphery an engaging groove 13 which is enagageable with the balls 11, said engaging groove having a width indicated by l. It is noted that the balls 11 are axially movable by the distance defined by l. Thus, a clutch arrangement 26 is defined by the aforesaid annular groove 7, through-holes 10, balls 11 and engaging groove 13. A pair of elongated holes 15 are axially formed in the shaft 12 in bisymmetrical fashion. A pin 16 fixedly inserted diametrically through the upper portion of the cylindrical member 8 is horizontally inserted into such holes 15, so that the cylindrical member 8 and the shaft 12 are fixed in their rotating direction. An annular cutter 17 is fixed to the lower end of the shaft 12 by a setscrew 18. A center drill 20 is placed through the rotation center of the annular cutter 17 for axially slidable movement. A drill holder 21 is disposed within the shaft 12, and is movable in the same direction as the center drill 20. The center drill 20 is fixed to the drill holder 21 by a setscrew 22. The drill holder 21 is provided in the upper end with an upward engaging groove 23 within which the pin 16 is engaged. A compression spring 24 is provided for giving a downward bias to the drill holder 21. Descending of the cylindrical member 8 causes the drill holder 21 to descend against the action of the spring 24 by the pin 16. In FIG. 3, a guide slot 17a for the center drill 20 is formed through the shaft of the annular cutter 17. The drill 20 includes a cutting blade 20a and a stem 20b. In this case, a large torque is obtained by engaging the pin 16 with the hollow shaft 12.

It should noted that the pin 16 is spaced away from the bottom of the engaging groove 23 by a distance (L) equal to the width l, and a through-hole 27 is provided in the shaft 12 to hold the setscrew 22 in place.

The drilling machine according to the present invention operates as follows.

Driving the motor for the drill 3 causes rotation of the shaft 12, so that the cylindrical member 8 rotates in unison with the annular cutter 17 by the pin 16. Subsequent turning of the handle 4 causes the shaft 12 to descend by the distance L until the pin 16 comes into contact with the bottom of the engaging groove 23, while no downward load is applied upon the center drill 20, so that it is kept idle above a workpiece 30. A further descent of the shaft 12 causes the pin 16 to engage the lower side of the groove 23 and the center drill 20 to initiate to descend, thereby forming a center hole 31. A still further descent of the shaft 12 causes the center hole 31 to be formed to a given depth, on the one hand, and the ball 11 to be engaged within the annular groove 7 formed in the holder 6, on the other hand, so that the shaft 12 disengages the ball 11, and is ready for independent descending, thus resulting in the drilling of a bore 32 of a larger diameter by the annular cutter 17. While the bore 32 of a larger diameter is formed by the annular cutter 17, the center drill 20 is rotated but prevented from descending due to the engagement of the cylindrical member 8 with the ball 11, and since the cylindrical member 8 is held on the outer surface of the shaft 12 and prevented from descending. As a consequence, the annular cutter 17 is maintained in axial alignment with the drilling machine by the center drill 20, since a downward force is constantly applied upon the center drill 20 by a compression spring 24 biasingly interposed between the upper face of the drill holder 21 and the pin 16 fixed to the cylindrical member 8.

With the present drilling machine which, as discussed above, includes an elevating hollow shaft 12 which is rotatable in unison with a spindle, and an annular cutter 17 mounted in axial alignment with the hollow shaft, and an elevating center drill 20 mounted in axial alignment with the annular cutter, said drill being designed to descend following the cutter, and begin to form a center hole in a workpiece prior to drilling, once the center hole 31 having a desired depth is formed by the center drill 20, drilling is continued by the annular cutter 17 in a state where the drill 20 remains fitted into the hole 31. Thus it is possible to prevent the annular cutter from being damaged during drilling. Furthermore, there is no fear that the center drill 20 may produce a hole having a depth larger than required, since the annular cutter 17 and the center drill 20 can rotate and move up and down simultaneously, or with a given time lag, in operative association with the up and down, and rotational movement of the hollow shaft 12. Therefore, a centering-to-drilling conversion can be achieved smoothly.

While the invention has been described in connection with one embodiment illustrated in the drawings, it should be understood that many changes or modifications may be made without departing from the scope and spirit of the appended claims.

I claim:
1. A drilling machine comprising:
   a spindle;
   a hollow shaft axially movable associated by elevating movement of the spindle;
   an annular cutter attached to an end of the shaft;
   a drill holder disposed within said hollow shaft for axially slidable movement;
   a center drill mounted fixedly within said drill holder and on the axis of the annular cutter, said center drill and drill holder being axially slidable independently of the annular cutter and the hollow shaft;
   a spring for axially biasing the center drill so that, while the drilling machine is not in operation, the end of the center drill extends beyond the edge of the annular cutter axially of the cutter;
   a cylindrical member mounted within a drilling machine holder for slidable movement in the axial direction of said hollow shaft, and in which said hollow shaft is relatively slidable with respect to said cylindrical member;
   at least one through-hole formed in the wall of said cylindrical member;
   at least one ball received in said through-hole;
   a first annular groove formed in the outer periphery of said hollow shaft for receiving said ball therein said groove having an axial length (1) permitting axial relative movement between said hollow shaft and the cylindrical member;
   a second annular groove formed in the inner periphery of said drilling machine holder for receiving said ball therein;
   an engaging groove formed in the upper end of said drill holder;
   axially elongated slots formed through the wall of the hollow shaft; and
   a pin extending transversely through said cylindrical member and through said axially elongated slots of the hollow shaft and fitted in said engaging groove, a distance (L) between said pin and the bottom of said associated engaging groove being equal to the axial length (1) of said first annular groove when said drilling machine is not in operation, said pin preventing relative rotation between said hollow shaft and cylindrical member but permitting the axial movement of said hollow shaft and annular cutter relative to said cylindrical member and center drill due to the existence of the axially elongated slots;
   whereby initially said ball is received in said first annular groove to lock the hollow shaft to the cylindrical member for said axial slidable movement of the hollow shaft and the cylindrical member in unison, and when disengaged from said first annular groove and engaged in said second annular groove as a result of said axial movement of the cylindrical member in unison with the hollow shaft, said ball prevents the axial movement of said cylindrical member while permitting the axial slidable movement of said hollow shaft and anular cutter relative to said drilling machine holder and center drill.

2. A drilling machine according to claim 1, wherein subsequent vertical downward movement of said hollow shaft and said pin engages said annular cutter with the workpiece while maintaining said center drill at a predetermined depth within the workpiece.

3. A drilling machine according to claim 1, and further including a setscrew for retaining said center drill relative to said drill holder.

4. A drilling machine according to claim 1, and further including a setscrew for retaining said annular cutter relative to said hollow shaft.

5. A drilling machine according to claim 1, wherein said ball has a diameter greater than the thickness of said cylindrical member.

* * * * *